United States Patent
Kobayashi et al.

(10) Patent No.: US 6,966,575 B2
(45) Date of Patent: Nov. 22, 2005

(54) AIR BAG SYSTEM MOUNTING STRUCTURE

(75) Inventors: Toru Kobayashi, Saitama (JP);
Takashi Nagata, Saitama (JP); Makoto Yamada, Saitama (JP); Yoshihiko Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 83 days.

(21) Appl. No.: 10/212,633

(22) Filed: Aug. 5, 2002

(65) Prior Publication Data
US 2003/0025306 A1 Feb. 6, 2003

(30) Foreign Application Priority Data
Aug. 6, 2001 (JP) .............................. 2001-238155

(51) Int. Cl.$^7$ ............................................. B60R 21/20
(52) U.S. Cl. .................................. 280/728.3; 280/732
(58) Field of Search ........................... 280/732, 728.3, 280/727, 731

(56) References Cited

U.S. PATENT DOCUMENTS

| | | | | |
|---|---|---|---|---|
| 5,294,147 A | * | 3/1994 | Edge | 280/728.3 |
| 5,333,897 A | * | 8/1994 | Landis et al. | 280/728.2 |
| 5,335,935 A | * | 8/1994 | Proos et al. | 280/728.3 |
| 5,362,096 A | * | 11/1994 | Satoh et al. | 280/728.3 |
| 5,863,062 A | * | 1/1999 | Harada et al. | 280/728.3 |
| 6,135,489 A | * | 10/2000 | Bowers | 280/728.3 |
| 6,443,484 B2 | * | 9/2002 | Anglsperger | 280/728.3 |
| 6,460,880 B1 | * | 10/2002 | Gallagher et al. | 280/732 |
| 6,517,100 B2 | * | 2/2003 | Frisch | 280/728.2 |
| 6,536,801 B2 | * | 3/2003 | Frisch | 280/743.1 |
| 6,613,415 B2 | * | 9/2003 | Iida et al. | 428/139 |

FOREIGN PATENT DOCUMENTS

JP 07-291078 11/1995

\* cited by examiner

Primary Examiner—Paul N. Dickson
Assistant Examiner—Laura B. Rosenberg
(74) Attorney, Agent, or Firm—Carrier, Blackman & Associates, P.C.; Joseph P. Carrier; William D. Blackman

(57) ABSTRACT

An air bag system for a front-seat passenger, includes a main body portion of an emblem is brought into contact with a surface of an instrument panel at a reverse face thereof, a bolt provided on the reverse face of the main body portion to protrude therefrom passes through the instrument panel and a mounting portion of an air bag module and a nut screwed on and fastened to the bolt so that the air bag module is fixed to the instrument panel easily and rigidly without using heat clamping which is less stable in quality. There is no risk that surface sinks are generated in the surface of the instrument panel to thereby deteriorate the aesthetic appearance thereof, since there is no need to provide bosses on a reverse face of the instrument panel for heat clamping.

11 Claims, 4 Drawing Sheets

AIR BAG SYSTEM MOUNTING STRUCTURE

BACKGROUND OF THE INVENTION

1. Field of the Invention

The present invention relates to an air bag system mounting structure for fixing an instrument panel and a mounting portion of an air bag module.

2. Description of the Related Art

An air bag module for a front-seat passenger is housed in the interior of an instrument panel. For example, the air bag module is supported on a pillar-to-pillar pipe which connects to left and right front pillars.

As a method for fixing to position a lower surface of the instrument panel and an upper surface of the air bag, JP-A-7-291078 discloses a method of fitting bosses protruded from a lower surface of an instrument panel of synthetic resin in mount holes, which are formed in a retainer of an air bag module, and then heat-clamping the bosses to fix the air bag module to the instrument panel.

Incidentally, in a case where a foam layer is provided between a skin and a base material of an instrument panel for a luxury specification, an air bag module can be securely fixed to the instrument panel by fixing the air bag module to a lower surface of the base material with bolts while avoiding the deterioration of the aesthetic appearance of the instrument panel by the bolts.

In addition, the air bag module can also be fixed to the instrument panel by heat claming bosses which are provided integrally on the lower surface of the base material so as to protrude therefrom.

In a case where the instrument panel is constructed as a single-layer instrument panel which does not have a foam layer, the fixing method uses the bolts which are exposed from the surface of the instrument panel, so that the fixing method has a problem that the aesthetic appearance of the instrument panel is deteriorated by the bolts.

In addition, processing time and costs become disadvantageous factors when the fixing method is used in which the bosses are heat clamped for fixing the air bag module to the instrument panel.

Furthermore, it is difficult to obtain a stable fixing strength due to change in processing conditions. Further, there is caused a problem that a surface sink is generated in the surface of the instrument panel at positions corresponding to the positions of the bosses, whereby the aesthetic appearance of the instrument panel is deteriorated.

SUMMARY OF THE INVENTION

It is an object of the invention to provide an air bag system mounting structure to attain an easy and secure fixation of an air bag module to a lower surface of an instrument panel without deteriorating an aesthetic appearance of a surface of the instrument panel.

According to a first aspect of the invention, an air bag system mounting structure is provided, comprising:

an instrument panel;

an air bag module having an inflator and an airbag, the air bag module being fixed inside the instrument panel at a mounting portion of the instrument panel; and an emblem including a main body portion with a reverse face brought into contact with a surface of the instrument panel, wherein a mounting portion of the air bag module and the instrument panel are fastened to the reverse face of the main body portion of the emblem.

According to the first aspect of the invention, the reverse face of the main body portion of the emblem is brought into abutment with the surface of the instrument panel, whereby the instrument panel and the mounting portion of the air bag module are fastened to the reverse face of the main body portion of the emblem.

Therefore, the air bag module can be fixed to the instrument panel securely and accurately without the conventional heat-clamping method which is less secure and which involves more cost.

In addition, since there is no need to have bosses provided on the lower surface of the instrument panel so as to protrude therefrom for heat clamping, even with a single-layer instrument panel which does not include a foam layer, it is possible to prevent the generation of surface sinks in the surface of the instrument panel at the positions corresponding to the positions of the bosses, so that the merchandising properties of a vehicle can be increased.

Moreover, the emblem can be a decoration to the instrument panel, so that the aesthetic appearance of the instrument panel can be improved.

According to a second aspect of the invention, in addition to the air bag system mounting structure according to the first aspect, wherein the emblem further includes at least one bolt protruding from the reverse face of the main body portion and passing through the instrument panel and the mounting portion of the air bag module and at least one nut screwed on the at least one bolt, and wherein the instrument panel and the mounting portion of the air bag module are interposed between the nut and the main body portion of the emblem.

According to the second aspect of the invention, since the bolt which protrudes from the reverse face of the main body portion of the emblem passes through the instrument panel and the mounting portion of the air bag module, the air bag module can be positioned accurately relative to the instrument panel.

Further, since the instrument panel and the mounting portion of the air bag module are held between the nut screwed on the bolt and the main body portion of the emblem, both the instrument panel and air bag module can be fixed to each other more rigidly.

According to a third aspect of the invention, in addition to the air bag system mounting structure according to the first aspect, wherein the emblem further includes at least one nut protruding from the reverse face of the main body portion and passing through the instrument panel and the mounting portion of the air bag module and at least one bolt screwed on the at least one nut, and wherein the instrument panel and the mounting portion of the air bag module are interposed between the bolt and the main body portion of the emblem.

According to the third aspect of the invention, since the nut provided on the reverse face of the main body portion of the emblem so as to protrude therefrom passes through the instrument panel and the mounting portion of the air bag module, the air bag module can be positioned accurately relative to the instrument panel.

Since the instrument panel and the mounting portion of the air bag module are held between the bolt screwed in the nut and the main body portion of the emblem, both the instrument panel and the air bag module can be fixed to each other more rigidly.

BRIEF DESCRIPTION OF THE INVENTION

DESCRIPTION OF THE PREFERRED EMBODIMENTS

A mode for carrying out the invention will be described below based on embodiments illustrated in the appended drawings.

Figure 1:
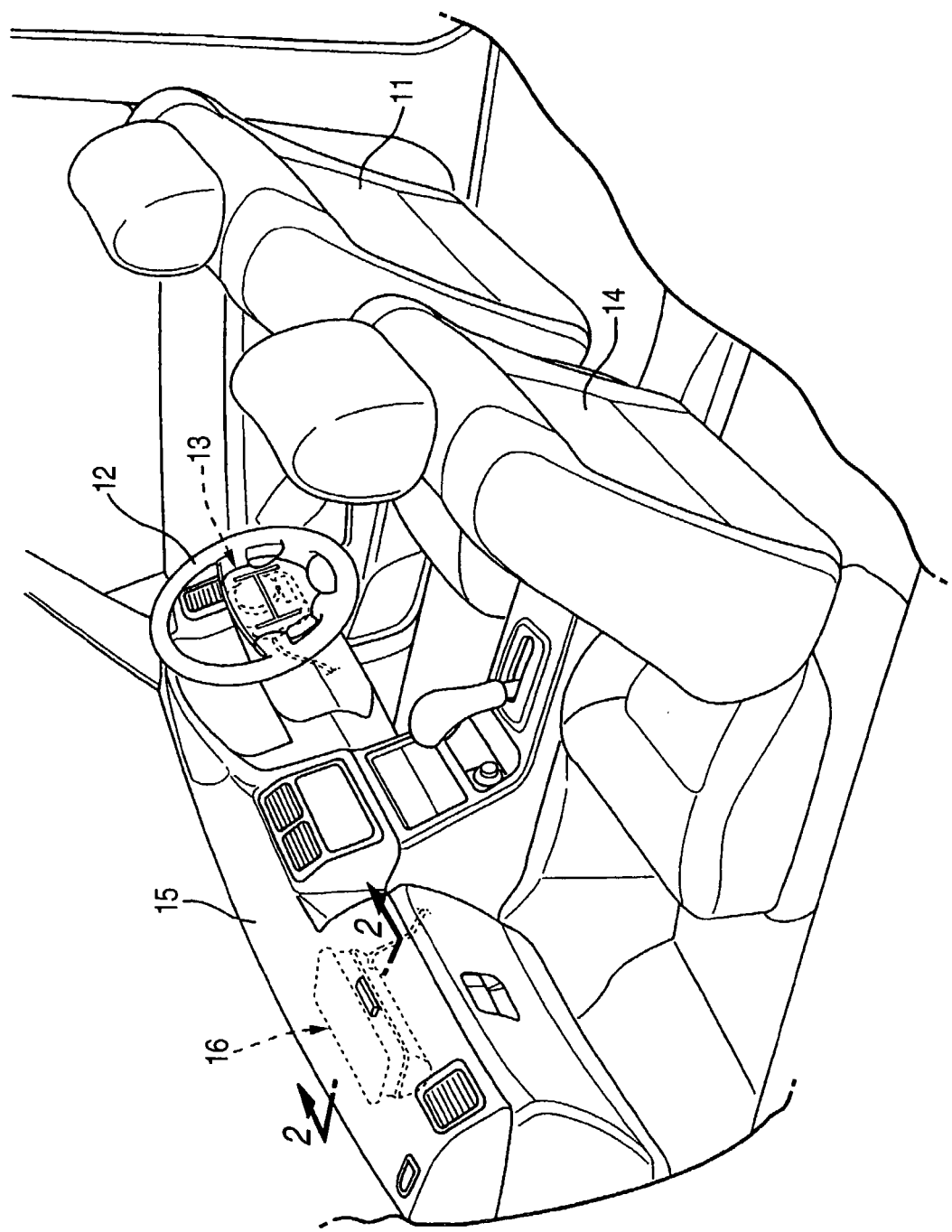
FIG. 1 is showing a perspective view of a front section of a passenger compartment of a vehicle.
Figure 2:
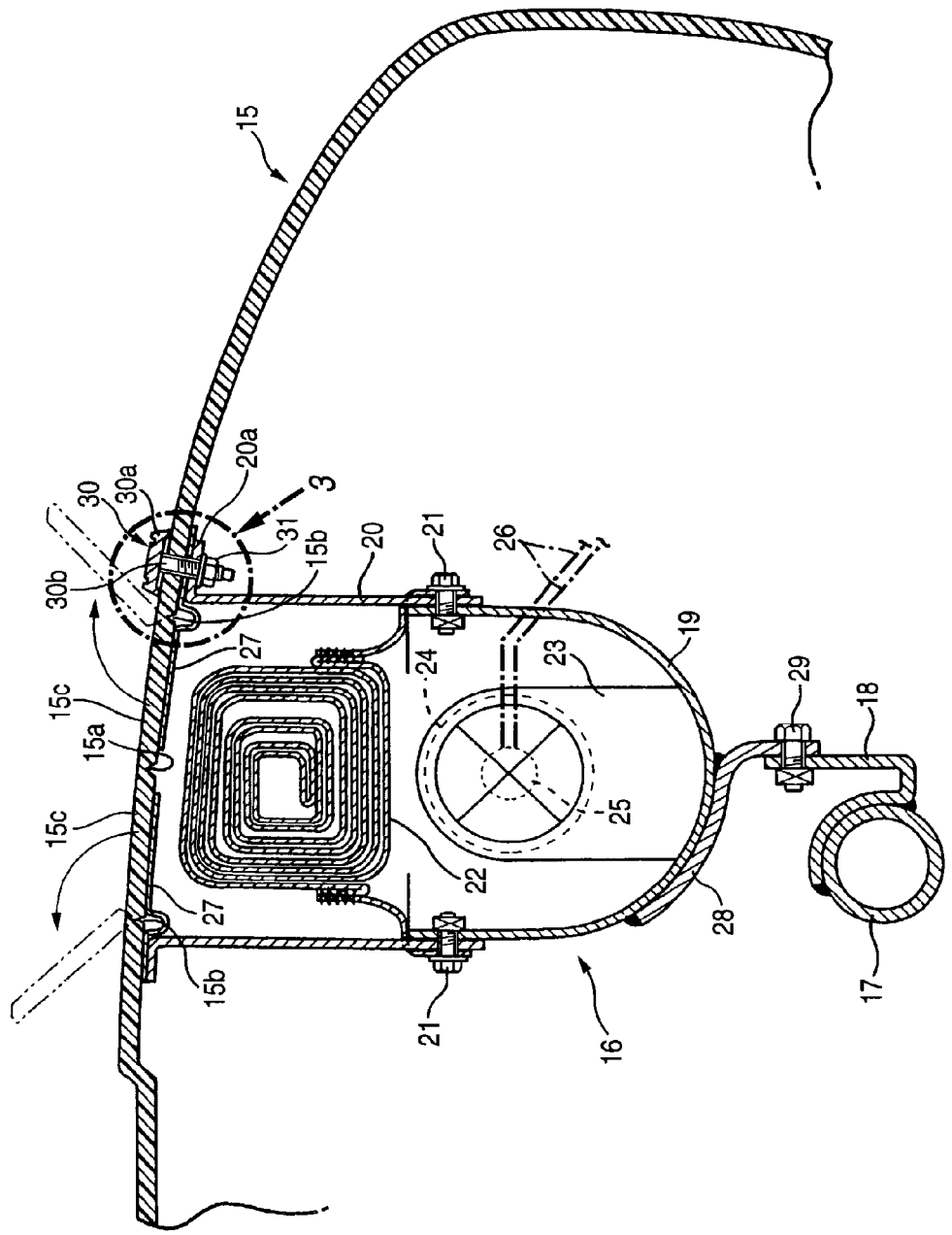
FIG. 2 is an enlarged cross-sectional view taken along the line 2—2 in FIG. 2.
Figure 3:
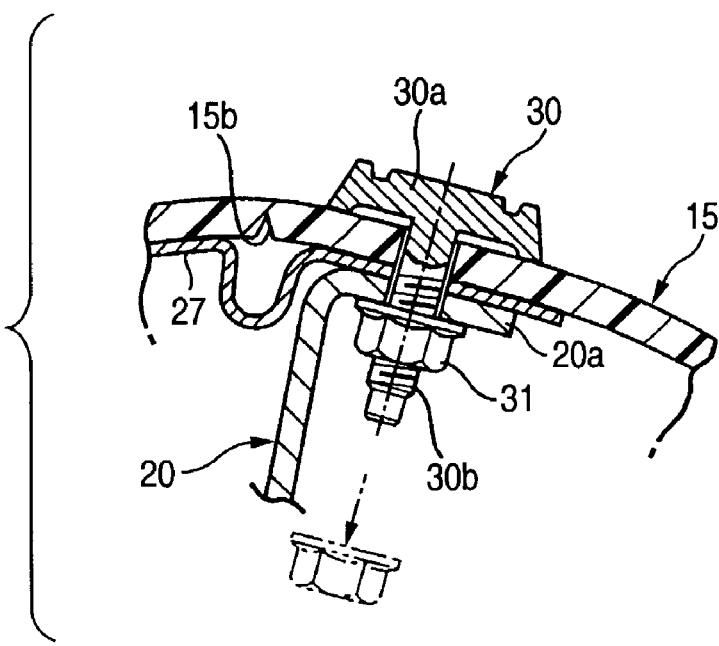
FIG. 3 is an enlarged view of a portion denoted by reference numeral 3 in FIG. 2.
Figure 4:
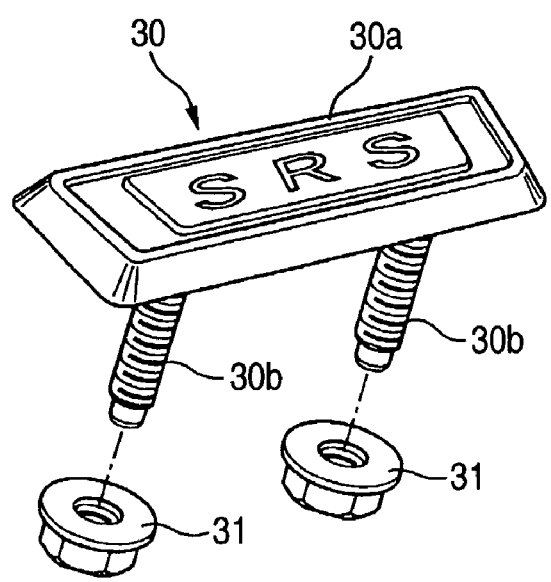
FIG. 4 is an exploded perspective view of an emblem and nuts.

FIGS. 1 to 4 shows a first embodiment of the invention. FIG. 1 is a perspective view of a front section of a passenger compartment of a vehicle. FIG. 2 is showing an enlarged cross sectional view taken along a line 2—2 in FIG. 1. FIG. 3 is showing an enlarged view of a portion denoted by reference numeral 3 in FIG. 2. FIG. 4 is an exploded perspective view of an emblem.

As shown in FIG. 1, an air bag module 13 for a driver is housed in the interior of a steering wheel facing a front side of a driver's seat of the vehicle, and an air bag module 16 for a front-seat passenger is housed in the interior of an instrument panel 15 facing a front side of a front passenger seat 14.

From FIGS. 2 to 4, a pillar-to-pillar pipe 17 is disposed in the interior of the instrument panel. The pillar-to-pillar pipe 17 connects to left and right front pillars.

A module supporting bracket 18 is welded to the pillar-to-pillar pipe 17.

The air bag module 16 for the front-seat passenger includes a lower retainer 19 opening in an upper surface thereof and an upper retainer 20 opening in upper and lower surfaces thereof.

An upper edge of the lower retainer 19 and a lower edge of the upper retainer 20 are overlapped with each other and are connected together with a plurality of bolts 21 . . . .

An opening of an air bag 22 folded down is caused to overlap a connecting portion of the lower retainer 19 and the upper retainer 20 and is fastened together with the retainers with a plurality of bolts 21 . . . .

A cylindrical inflator 24 is supported in the interior of the lower retainer 19 with a pair of brackets 23, 23 A squib 25 for igniting the inflator 24 is connected to an ignition control device, not shown, via a lead wire 26.

An instrument panel 15 has a layer of a synthetic resin. The instrument panel 15 does not have a foam layer.

In addition, an H-shaped tear line 15a and two linear hinge lines 15b, 15b are formed thinner in an internal surface of the instrument panel 15, which faces the air bag module 16. An area surrounded by the tear line 15a and the hinge lines 15b, 15b is constructed into two lids 15c, 15c. The two lids are adapted to open when the air bag 22 is deployed.

Namely, the tear line 15a is broken and the lids 15c, 15c open outwardly around the hinge lines 15b, 15b, respectively, whereby an opening is formed for deploying the air bag 22 when a pressure of the air bag 22, which inflates in the interior of the upper retainer 20, is exerted on internal surfaces of the lids 15c, 15c.

In order to prevent the lids 15c, 15c from being scattered, thin metallic hinge plates 27, 27 are laminated on a lower surfaces of the lids 15c, 15c which include the hinge lines 15b, 15b. The hinge plates 27, 27 are folded into a U-shape at positions corresponding to the positions of the hinge lines 15b, 15b so as to facilitate a bending of the hinge plates 27, 27.

A module mounting bracket 28 welded to the lower retainer 19 is fixed to the module support bracket 18 with bolts 29 . . . , whereby the air bag module 16 is supported on the pillar-to-pillar pipe 17 rigidly. The module support bracket 18 is welded to the pillar-to-pillar pipe 17.

An emblem 30 integrally formed of a metal is utilize for fixing a flange-like mounting portion 20a formed at an upper edge of the upper retainer 20 of the air bag module 16, while the mounting portion 20a is positioned relative to the tear line 15a and the hinge lines 15b, 15b of the instrument panel 15.

The emblem 30 includes a plate-like main body portion 30a showing on a surface thereof characters, SRS, which represent an air bag system (or the name of a vehicle or a brand) and two bolts 30b, 30b which protrude from the reverse face of the main body portion 30a.

The two bolts 30b, 30b pass through the instrument panel 15, the hinge plates 27 and the mounting portion 20a of the upper retainer 20 from top to bottom. Nuts 31, 31 are screwed and fastened on the bolts 30b, 30b, respectively, in such a manner that the instrument panel 15, the hinge plate 27 and the mounting portion 20a are held together between the bolts and the nuts.

Thus, since the upper surface of the air bag module 16 is positioned relative to the lower surface of the instrument panel 15 used for fixing the emblem 30, a conventional heat-clamping method, which is unstable in workability and costs more, is not necessary. Further, an accuracy with which the air bag module 16 is positioned relative to the instrument panel 15 is increased by allowing the two bolts 30b, 30b to pass through the instrument panel 15, the hinge plate 27 and the mounting portion 20a of the upper retainer 20.

As a result, there is no need to provide bosses on the lower surface of the instrument panel 15 so as to protrude therefrom for heat clamping. Even with the single-layered instrument panel 15 which includes no foam layer, the generation of a dent in the surface of the instrument panel 15 which would otherwise occur due to the provision of the bosses can be prevented. Therefore, the merchandising properties of the vehicle increases. Furthermore, since the emblem 30 can be a decoration to the instrument panel 15, the aesthetic appearance of the instrument panel 15 can be improved.

Figure 5:
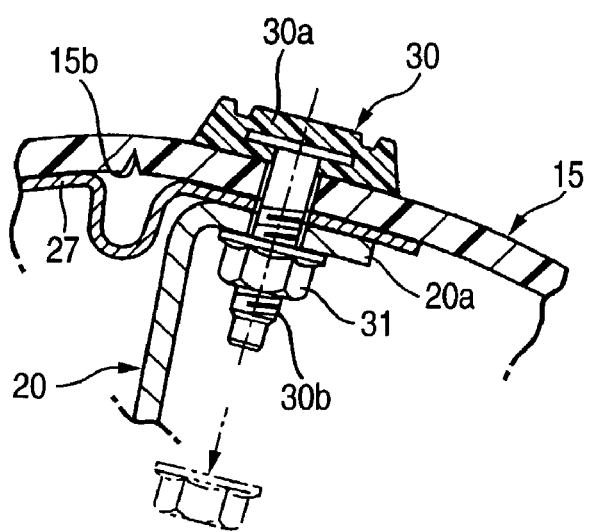
FIG. 5 is a view corresponding to FIG. 3 which relates to a second embodiment of the invention.

Next, a second embodiment of the invention will be described with reference to FIG. 5.

According to the second embodiment, the main body portion 30a of the emblem 30 is made from a synthetic resin. Two bolts 30b, 30b, whose head portions are embedded in a main body portion 30a of the emblem 30, protrude downwardly from a lower side thereof. According to the second embodiment, the production costs can be reduced by making the main body portion 30a of the emblem 30.from the synthetic resin.

Figure 6:
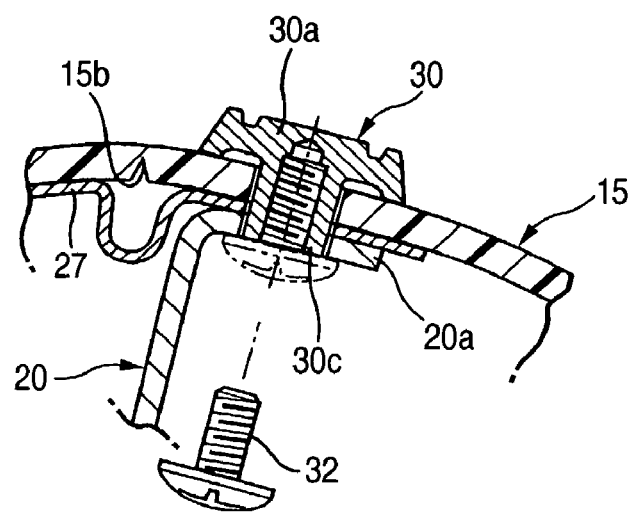
FIG. 6 is a view corresponding to FIG. 3 which relates to a third embodiment of the invention.

Next, a third embodiment of the invention will be described with reference to FIG. 6.

An emblem 30 according to the third embodiment has two nuts 30c, 30c which protrude from a reverse face of the main body portion 30a of the emblem 30. The nuts 30c, 30c pass, respectively, through an instrument panel 15, a hinge plate 27 and a mounting portion 20a of an upper retainer 20 and two bolts 32, 32 screwed and fastened in the nuts 30c, 30c, respectively. With this embodiment, too, the function and effectiveness similar to those provided by the second embodiment can be provided.

While the embodiments of the invention have thus been described in detail, various modifications in design may be made to the invention without departing from the spirit and scope of the invention.

For example, while the two bolts 30b, 30b or the two nuts 30c, 30c are provided on the emblem 30, the numbers of bolts and nuts can be modified as required. In addition, two or more emblems 30 may be used.

In addition, the fastening means for the emblem 30 is not limited to the nuts and bolts, and any appropriate fastening means such as clips may be adopted as required.

Additionally, the entirety of the emblem 30 may be formed from a synthetic resin.

According to the first aspect of the invention, the reverse face of the main body portion of the emblem is brought into abutment with the surface of the instrument panel, whereby the instrument panel and the mounting portion of the air bag module are fastened to the reverse face of the main body portion of the emblem.

Therefore, the air bag module can be fixed to the instrument panel securely and accurately without the conventional heat-clamping method which is less secure and which involves more cost.

In addition, since there is no need to have bosses provided on the lower surface of the instrument panel so as to protrude therefrom for heat clamping, even with a single-layer instrument panel which does not include a foam layer, it is possible to prevent the generation of surface sinks in the surface of the instrument panel at the positions corresponding to the positions of the bosses, so that the merchandising properties of a vehicle can be increased.

Moreover, the emblem can be a decoration to the instrument panel, so that the aesthetic appearance of the instrument panel can be improved.

According to the second aspect of the invention, since the bolt which protrudes from the reverse face of the main body portion of the emblem passes through the instrument panel and the mounting portion of the air bag module, the air bag module can be positioned accurately relative to the instrument panel. Further, since the instrument panel and the mounting portion of the air bag module are held between the nut screwed on the bolt and the main body portion of the emblem, both the instrument panel and air bag module can be fixed to each other more rigidly.

According to the third aspect of the invention, since the nut provided on the reverse face of the main body portion of the emblem so as to protrude therefrom passes through the instrument panel and the mounting portion of the air bag module, the air bag module can be positioned accurately relative to the instrument panel.

Since the instrument panel and the mounting portion of the air bag module are held between the bolt screwed in the nut and the main body portion of the emblem, both the instrument panel and the air bag module can be fixed to each other more rigidly.

What is claimed is:

1. An air bag system mounting structure, comprising:
   an instrument panel;
   an air bag module having an inflator and an air bag;
   the air bag module being fixed to an interior surface of the instrument panel at a mounting portion of the instrument panel;
   an emblem including a main body portion formed of resin with a reverse face brought into contact with an exterior surface of the instrument panel; and
   a hinge plate covering an upper opening of said air bag module, and said emblem extends through a portion of said hinge plate so as to be positioned laterally outward of said upper opening of the air bag module, said hinge plate confronting and being fixed to the interior surface of the instrument panel
   wherein a mounting portion of the air bag module and the instrument panel are fastened to the reverse face of the main body portion of the emblem.

2. The air bag system mounting structure according to claim 1, wherein the emblem further includes at least one bolt protruding from the reverse face of the main body portion and passing Through the instrument panel and the mounting portion of the air bag module and at least one nut screwed on the at least one bolt, and
   wherein the instrument panel and the mounting portion of the air bag module are interposed between the nut and the main body portion of the emblem.

3. The air bag system mounting structure according to claim 1, wherein the emblem further includes at least one nut protruding from the reverse face of the main body portion and passing through the instrument panel and the mounting portion of the air bag module and at least one bolt screwed on the at least one nut, and
   wherein the instrument panel and the mounting portion of die air bag module are interposed between the bolt and the main body portion of the emblem.

4. The air bag system mounting structure according to claim 1, wherein the emblem further includes at least one fastener protruding from the reverse face of the main body portion and passing through the instrument panel and the mounting portion of the air bag module, and
   wherein the instrument panel and die mounting portion of the air bag module are interposed between a protruding end of the fastener and the main body portion of the emblem.

5. The air bag system mounting structure according to claim 1, wherein the air bag module has a lower portion fixed to a structural member of a vehicle body, and the mounting portion of the air bag module fastened to the reverse face of the main body portion of the emblem is at an upper part of the module.

6. The air bag system mounting structure according to claim 1, further comprising an air bag module lid defined in the instrument panel and a hinge plate connected to the lid, and said lid is also fastened to the reverse face of the main body portion of the emblem.

7. The air bag system mounting structure according to claim 1, wherein said inflator is disposed beneath said air bag in said module.

8. The air bag system mounting structure according to claim 1, wherein said emblem is disposed laterally outwardly of said air bag in said module.

9. An air bag system mounting apparatus for a vehicle comprising an air bag module, an instrument panel, and a fixing means wherein
   the instrument panel comprises an exterior surface which faces the vehicle occupant area and an interior surface opposed to the exterior surface, the instrument panel comprises plural tear lines and hinge lines positioned at a location overlying the air bag module, the plural tear lines and hinge lines arranged to form at least one lid adapted to open outward upon inflation of the airbag, the air bag module comprises a housing which houses an air bag and an inflator, the air bag module being secured to the interior surface of the instrument panel by the fixing means, the fixing means comprising an emblem and at least one hinge plate, the emblem comprising a main body portion formed of resin with a reverse face brought into contact with the exterior surface of the instrument panel and a threaded portion which extends completely through The instrument panel, the housing of the air bag module, and the at least one hinge plate, the at least one hinge plate being secured to the interior surface of the instrument panel and shaped to underlie the hinge lines foamed in the instrument panel but not to underlie the tear lines formed in the instrument panel, the at least one hinge plate comprising a U-shaped fold extending toward the interior of the instrument panel and being aligned with and underlying the hinge lines formed in the instrument panel, wherein the instrument panel, the housing of the air bag module, and the at least one hinge plate are fastened to the reverse face of the main body portion of the emblem using a nut engaged with the threaded portion.

10. The air bag system mounting structure according to claim 9, wherein said emblem is disposed laterally outwardly of said air bag in said module.

11. The air bag system mounting structure according to claim 9, wherein said threaded portion of the emblem extends through a portion of the hinge plate disposed laterally outwardly of the air bag module housing.

* * * * *